(12) United States Patent
Odaohhara

(10) Patent No.: US 8,203,314 B2
(45) Date of Patent: Jun. 19, 2012

(54) SURFACE TEMPERATURE DEPENDENT BATTERY CELL CHARGING SYSTEM

(75) Inventor: Shigefumi Odaohhara, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 938 days.

(21) Appl. No.: 12/234,381

(22) Filed: Sep. 19, 2008

(65) Prior Publication Data

US 2009/0085527 A1    Apr. 2, 2009

(30) Foreign Application Priority Data

Sep. 19, 2007   (JP) .................................. 2007-241689

(51) Int. Cl.
    *H02J 7/04*   (2006.01)
    *H02J 7/00*   (2006.01)
(52) U.S. Cl. .......................... 320/150; 320/128; 320/138
(58) Field of Classification Search .................. 320/150, 320/128, 138
    See application file for complete search history.

(56) References Cited

FOREIGN PATENT DOCUMENTS

| JP | H10-014125 | 1/1998 |
| JP | H11-018314 | 1/1999 |
| JP | H11-252814 | 9/1999 |
| JP | 2002-165380 | 6/2002 |
| JP | 2005-245078 | 9/2005 |
| JP | 2006-020446 | 1/2006 |
| JP | 2006-304572 | 11/2006 |

*Primary Examiner* — Reena Aurora
(74) *Attorney, Agent, or Firm* — Ference & Associates LLC

(57) ABSTRACT

A charging system capable of charging a battery cell so that the surface temperature of the battery cell does not exceed an upper temperature limit, is provided. A battery charger is configured in a manner such that a setting current is variable during charging. The battery charger starts charging of a secondary battery with a setting voltage set to a minimum charging current value. The surface temperature of the secondary battery is measured during charging. An estimated temperature value is calculated which is a surface temperature of the secondary battery, at which the secondary battery is charged up until a charging amount corresponding to the maximum surface temperature under assumption that the charging is performed with a present charging current value. The setting current is increased when the estimated temperature value is lower than the target temperature range and is reduced when the estimated temperature value is higher than the target temperature range. When the estimated temperature value belongs to the target temperature range, a present setting current is maintained.

19 Claims, 7 Drawing Sheets

| CHARGING CURRENT (ItA) | CORRECTED RSOC (%) |
|---|---|
| 0.7 | 70 |
| 0.6 | 75 |
| 0.5 | 80 |
| 0.4 | 83 |
| 0.3 | 85 |

SURFACE TEMPERATURE DEPENDENT BATTERY CELL CHARGING SYSTEM

CLAIM FOR PRIORITY

This application claims priority from Japanese Application No. 2007-241689 filed on Sep. 19, 2007, and which is fully incorporated by reference as if fully set forth herein.

FIELD OF THE INVENTION

The present invention relates generally to a technology for charging a secondary battery in a manner such that the surface temperature of the secondary battery does not exceed an upper temperature limit.

BACKGROUND OF THE INVENTION

In a notebook personal computer (hereinafter, referred to as "notebook PC" for simplicity), which is an example of a portable or mobile type electronic device, a lithium ion rechargeable battery is generally used. In recent years, a number of battery pack-related fire accidents has been reported, and safety guidelines have been released for safe use of lithium ion batteries by cooperation of BAJ (The Battery Association of Japan) and JEITA (Japan Electronics and Information Technology Industries Association). The safety guidelines are available from the associations' home pages on the Internet.

According to the safety guidelines, it is recommended that the maximum value(s) of the charging current and/or the charging voltage should be limited depending on the surface temperature of the battery cell when charging the lithium ion batteries.

According to the guidelines (and as shown in FIGS. 9A and 9B) the surface temperature of the battery cell is defined such that a temperature range from T1 to T2 is a low temperature range, a temperature range from T2 to T3 is a standard temperature range, and a temperature range from T3 to T4 is a high temperature range. Although the guidelines state that the values specifying the respective temperature ranges are to be determined by manufacturers through a predetermined test and verification, at present, the values are specified as follows: a lower charging temperature limit T1 is 0 degrees in centigrade (hereinafter similarly), a lower limit of the standard temperature range (an upper limit of the low temperature range) T2 is 10 degrees, an upper limit of the standard temperature range (a lower limit of the high temperature range) T3 is 45 degrees, and an upper charging temperature limit T4 is 55 degrees.

In the guidelines, a maximum charging current and an upper charging voltage limit are specified for each temperature range. The standard temperature range is a surface temperature range of a battery cell in which highest values are applied to the maximum charging current and the upper charging voltage limit. The guidelines state that a standard maximum charging current value Imax1 in the standard temperature range be set to 0.7 ItA and that a standard upper charging voltage limit Vmax1 be set to 4.25 V. At this stage, the unit ItA as used herein represents a unit of current flowing through a secondary battery during charging/discharging and is defined as ItA=(rated battery capacity) (Ah)/1(h). The maximum charging current and the upper charging voltage limit in the low temperature range and the high temperature range are determined by respective manufacturers.

The low temperature range is a temperature range defined to be lower than the standard temperature range and is a surface temperature range of the battery cell during charging, which is permissible on condition that both or either one of the standard maximum charging current value Imax1 and the standard upper charging voltage limit Vmax1 is decreased from the viewpoint of safety. As an example, a low-temperature maximum charging current value Imax2 in the low temperature range is set to 0.3 ItA, and a low-temperature upper charging voltage limit Vmax2 is set to 4.15 V. The high temperature range is a temperature range defined to be higher than the standard temperature range, and is a surface temperature range of the battery cell during charging, which is permissible on condition that both or either one of the standard maximum charging current value Imax1 and the standard upper charging voltage limit Vmax1 is varied from the viewpoint of safety. As an example, a high-temperature maximum charging current value Imax3 in the high temperature range is set to 0.3 ItA, and a high-temperature upper charging voltage limit Vmax3 is set to 4.20 V.

Japanese Laid-open (Kokai) Patent Publication No. 2006-020446 discloses a technology for estimating a battery temperature at a lapse (of X seconds) after the start of charging to control a charging current based on the estimated temperature, thereby preventing the battery temperature from increasing abnormally.

Japanese Laid-open (Kokai) Patent Publication No. 2005-245078 discloses a technology that solves a problem that when an ambient temperature of a secondary battery exceeds an allowable value, charging is stopped and the time to full charging increases. According to the technology described in that patent document, a database is preliminarily constructed by extracting the relationship between the charging current values and an ambient temperature rise in the secondary battery, and when the ambient temperature rises during charging due to environmental influences, the charging current value to the secondary battery is controlled to thereby suppress the temperature rise in the secondary battery, whereby the charging can be completed without interruption.

Japanese Laid-open (Kokai) Patent Publication No. 10-014125 discloses a technology for enabling full charging of a NiMH battery even when charging is started with a condition where a temperature thereof approximately reaches to that near the upper limit of a charge-permissible temperature range. According to the technology described in that patent document, when a present battery temperature has reached the vicinity of the upper limit of the charge-permissible temperature, a current value corresponding to the battery temperature is calculated to reduce the charging current to the calculated current value, thereby ensuring that the battery temperature is prevented from exceeding the upper limit of the battery temperature.

Japanese Laid-open (Kokai) Patent Publication No. 2002-165380 discloses a technology for preventing the temperature of a NiMH battery from reaching a critical level during charging. According to the technology disclosed in that patent document, a charging rate is controlled such that a rate of temperature rise as per unit time ($\Delta T/t$) is kept constant.

The battery cell generates heat during charging and discharging, and the temperature appearing at the surface of a housing of the battery cell (hereinafter, referred to as surface temperature, for the simplicity sake) increases by approximately 7 degrees at the end of the charging. In a battery pack mounted on the notebook PC, when the notebook PC placed in a normal temperature environment is operating while it is supplied with electric power from an AC/DC adapter, the surface temperature becomes about 30 degrees. In such a state, when the AC/DC adapter is detached from the notebook PC and electric power is supplied from the battery pack to the notebook PC, the surface temperature reaches approximately 45 degrees at the end of discharging. Thereafter, when the AC/DC adapter is connected to charge the battery cell, there is a possibility that the surface temperature belongs to the high temperature range before the charging is completed.

When the surface temperature of the battery cell belongs to the high temperature range while charging is performed in the standard temperature range, according to the safety guidelines, it is necessary to lower the standard upper charging voltage limit Vmax1 to the high-temperature upper charging voltage limit Vmax3. Therefore, the charging cannot be performed up to the full charge capacity, with the result that the operation time of the notebook PC during mobile use decreases. Moreover, when the standard maximum charging current value Imax1 is reduced to the high-temperature maximum charging current value Imax3, the time necessary for reaching the full charging is prolonged while bringing such a result that there is a possibility that by the time the AC/DC adapter is removed from the notebook PC for mobile use, the charging has not yet completed to fulfill the condition of the full charge capacity.

Accordingly, a compelling need has been recognized in connection with addressing the above-described shortcomings.

SUMMARY OF THE INVENTION

In accordance with one presently preferred embodiment of the present invention, the principle of the present invention as broadly contemplated lies in providing a charging system capable of charging a secondary battery up until the full charge capacity while preventing the surface temperature of the secondary battery from exceeding an upper temperature limit.

In summary, one aspect of the invention provides an apparatus comprising: a temperature element that measures a surface temperature of a battery; and a charging control unit that receives an output from the temperature element and varies a current to the battery based on a result of comparison between an estimated surface temperature and a target temperature range to maintain the surface temperature of the battery within the target temperature range.

An additional aspect of the invention provides a method comprising: measuring a surface temperature of a battery; providing a target temperature range; calculating an estimated surface temperature; comparing the estimated surface temperature with the target temperature range; and varying a current charging the battery so that a surface temperature of the battery does not exceed an upper temperature limit of the target temperature range.

Furthermore, another aspect of the invention provides a program storage device readable by machine, tangibly embodying a program of instructions executable by the machine to perform a method comprising: receiving a measured surface temperature of a battery; providing a target temperature range; calculating an estimated surface temperature; comparing the estimated surface temperature with the target temperature range; and calculating appropriate variations for a current charging the battery so that a surface temperature of the battery does not exceed an upper temperature limit of the target temperature range.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
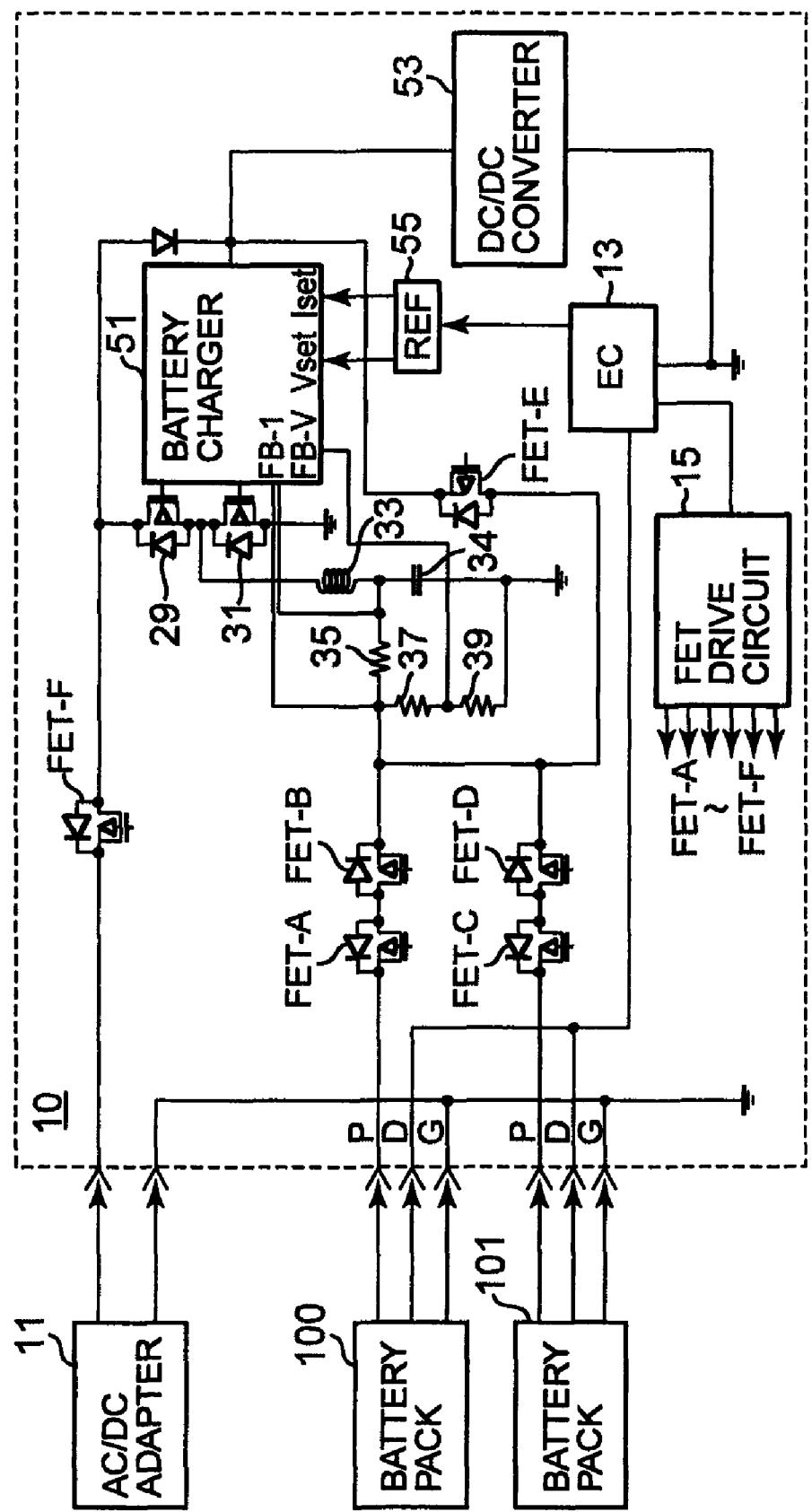
FIG. 1 is a block diagram illustrating an outline of a charging system including a battery pack according to the present invention and a notebook PC having mounted thereon the battery pack.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 9B, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

The remainder of the disclosure begins with a general overview of the instant invention and proceeds to give a more detailed description of preferred embodiments of the invention with reference to the accompanying figures. A description of the symbols used throughout this disclosure is also provided near the end of this disclosure for ease of reference.

One aspect of the present invention provides a charging system capable of charging a secondary battery up until the full charge capacity while preventing the surface temperature of the secondary battery from exceeding an upper temperature limit.

Another aspect of the present invention provides a charging system capable of dynamically varying a charging current to perform charging while preventing the surface temperature from exceeding an upper temperature limit.

A further aspect of the present invention provides a charging system capable of performing charging while preventing the surface temperature from exceeding an upper temperature limit even when an ambient temperature varies during charging.

A still further aspect of the present invention provides an apparatus, a charging method, a battery pack, and a computer program product capable of implementing the charging system.

A further aspect of the present invention provides a charging system is configured to charge a secondary battery so that the surface temperature of the secondary battery does not exceed an upper temperature limit. When the surface temperature exceeds the upper temperature limit and when both or either one of a charging current and a charging voltage is to be limited, the charging is performed in a manner such that the surface temperature does not exceed the upper temperature limit, whereby the charging can be performed up until the full charge capacity. A battery charger is configured such that a setting current is variable during charging. A temperature element measures the surface temperature of the secondary battery. A control unit is configured to receive an output from the temperature element and periodically calculate an estimated temperature value corresponding to the surface temperature under assumption that the secondary battery is charged with a present charging current value up to a predetermined charging amount. A target temperature range is established so as to extend in a temperature range coming below the upper temperature limit. The control unit varies the setting current of the battery charger based on a result of the periodic comparison between the estimated temperature value and the target temperature range.

In order to charge the secondary battery so that the surface temperature does not exceed the upper temperature limit, the charging current may be set to take a sufficiently low value, which, however, may extremely increase a necessary charging time, with such a result that it is practically difficult to charge up until the full charge capacity. In the present invention, the periodically calculated, estimated temperature value corresponds to the surface temperature under assumption that charging lasts with the present charging current value. Therefore, the setting current of the battery charger is dynamically changed based on the result of the periodic comparison between the estimated temperature value and the target temperature range. The control unit corrects the setting current by periodically calculating and comparing the estimated temperature value with the target temperature range even when the ambient temperature varies during charging. Therefore, the charging system according to the present invention can perform charging with the largest charging current that is allowed by the surface temperature at a charge start time and the ambient temperature during charging while preventing the surface temperature from exceeding the upper temperature limit.

When the predetermined charging amount is selected so as to correspond to a charging amount at which the surface temperature becomes the maximum when the charging is performed with the present charging current value, it is possible to securely charge the secondary battery so that the surface temperature does not exceed the upper temperature limit. The charging amount at which the surface temperature becomes the maximum may be a charging amount at which the battery charger switches its operation from a constant current control mode to a constant voltage control mode. The predetermined charging amount may be represented by an RSOC (Relative State of Charge) (%) at a time when the surface temperature becomes the maximum value in a case where the charging is performed with the standard maximum charging current. In this case, since the RSOC (%) corresponding to the maximum surface temperature varies depending on the charging current, it is preferable to prepare a correction table in which the RSOC (%) at which the surface temperature becomes the maximum value is set for each magnitude of the charging current.

In the charging system, a standard temperature range may be defined in which it is permissible to perform charging with a charging current lower than a standard maximum charging current value, and in which the upper limit of the standard temperature range is identical to the upper temperature limit. In such a case, the battery charger charges the secondary battery with a charging current lower than the standard maximum charging current value over an entire constant current control period and thereafter, transitions to a constant voltage control period. Therefore, the surface temperature does not exceed the upper temperature limit until the charging is completed even when the surface temperature is high at the charging start time. Here, the constant current control period as used herein is used to include not only a case where the setting current is constant over the entire constant current control period, but also a period in which the setting current of the battery charger is dynamically changed, and the battery charger is operated with the respective changed setting currents in a constant current control mode.

When the upper limit of the target temperature range is set to a value that is one to three degrees in temperature lower than the upper temperature limit, and when the width of the target temperature range is set to a value ranging from one to three degrees, it is possible to cope with an abrupt change in an ambient temperature. Moreover, it is possible to prevent the charging current from being set to a lower value and to thus prevent the charging time from increasing. The control unit is configured to reduce the setting current when the estimated temperature value exceeds the target temperature range, maintain the setting current when the estimated temperature value belongs to the target temperature range, and increase the setting current when the estimated temperature value comes below the target temperature range. The control unit is configured to set the setting current of the battery charger to a minimum charging current value when the estimated temperature value exceeds the upper temperature limit because the actual surface temperature may exceed the upper temperature limit when the charging lasts with the present charging current. The minimum charging current value corresponds to the minimum value of the charging current set by the charging system.

The estimated temperature value can be calculated from a time-increase rate of the surface temperature per a predetermined monitoring time and a charging time required for reaching the predetermined charging amount. By calculating the charging time required for reaching the predetermined charging amount based on an average value of a charging current flowing during the monitoring time, it is possible to precisely calculate the estimated temperature value even when the actual charging current is lower than the setting current of the battery charger due to increase in the load consumption power. The setting current experiences a variety of variations due to a change in the surface temperature at the charge start time or in the ambient temperature from the start to the end of the charging. The control unit may be configured to store therein the history of the surface temperature or the ambient temperature when charging is actually performed to thereby select the minimum charging current value that is to be initially set when a subsequent charging is started based on the history.

In accordance with the above-mentioned various aspects of the present invention, it is possible to provide a charging system capable of charging a secondary battery up until the full charge capacity while preventing the surface temperature of the secondary battery from exceeding an upper temperature limit. Further, it is possible to provide a charging system capable of dynamically varying a charging current to perform charging while preventing the surface temperature from exceeding an upper temperature limit. Furthermore, it is possible to provide a charging system capable of performing charging while preventing the surface temperature from exceeding an upper temperature limit even when an ambient temperature varies during charging. Furthermore, it is possible to provide an apparatus, a charging method, a battery pack, and a computer program product capable of implementing the charging system.

Referring now to the Figures, FIG. 1 is a block diagram illustrating an outline of a charging system including a battery pack according to the present invention and a notebook PC having mounted thereon the battery pack. The charging system includes a notebook PC 10, an AC/DC adapter 11, and battery packs 100 and 101. The battery pack 100 is used as a main battery pack, and the battery pack 101 is used as an auxiliary battery pack. The battery pack 100 and the battery pack 101 have the same construction in the present invention; however, the charging system may be constructed by only the battery pack 100 in a state where the battery pack 101 is not mounted thereon. The notebook PC 10 is illustrated with only the primary constructions related to the present invention. The AC/DC adapter 11 is configured to be connectable to a power supply line of the notebook PC 10, and the battery packs 100 and 101 are removably accommodated in a battery bay of the notebook PC 10. The AC/DC adapter 11 converts an AC voltage to a DC voltage.

The battery charger 51 has constant-current/constant-voltage characteristics. The battery charger 51 includes a switching control circuit that controls turning on/off of an FET 29 and an FET 31 in a PWM method and a smoothing circuit composed of an inductor 33 and a capacitor 34. The battery charger 51 converts a DC voltage input from the AC/DC adapter 11 to a DC voltage suitable for charging the battery pack and outputs the converted voltage. The battery charger 51 suppresses the pulsation of the DC charging current generated through the switching control circuit by using the smoothing circuit to thereby generate a constant current. To the voltage feedback input FB-V and the current feedback input FB-I of the battery charger 51, voltage-dividing resistors 37 and 39 and an output from the current sense resistor 35 are connected, respectively, and voltages corresponding to the output voltage and output current of the battery charger 51 are input for feedback control.

Here, the output voltage of the battery charger 51 is identical to the charging voltage of the battery set 106 when a voltage drop at a wiring resistance appearing from the battery charger to the terminals of the battery set 106. In a constant voltage control period, the battery charger 51 is operated such that the output voltage is identical to the setting voltage Vchg. Moreover, the output current of the battery charger 51 is equal to the charging current flowing through the battery set 106. In a constant current control period, the battery set 51 is operated such that the output current is identical to the setting current Ichg. When the consumption power of the notebook PC 10 is small, in the constant current control period, the output current of the battery charger 51 becomes equal to the setting current Ichg. However, at the time of start-up or special operations when the consumption power of the notebook PC 10 becomes large, the output current may sometimes decrease below the setting current Ichg. In the present specification, the current flowing through the battery set 106 will be referred to as an output current when attention is paid to the battery charger 51, and will be referred to as a charging current when attention is paid to the battery set 106.

To a current setting value input Iset and a voltage setting value input Vset of the battery charger 51, voltages from a reference voltage source 55, which are divided from a constant voltage generated within the notebook PC 10 are input. The reference voltage source 55 inputs the setting voltage Vchg to the voltage setting value input Vset and the setting current Ichg to the current setting value input Iset in accordance with instructions from an embedded controller (EC) 13. The battery charger 51 is operated such that the output voltage does not exceed the setting voltage Vchg and that the output current does not exceed the setting current Ichg. Although the battery charger 51 is operated in a constant current control mode in an initial period of charging where the charging current is large so that the output current is identical to the setting current Ichg, when the charging voltage increases with the progress of the charging, the battery charger 51 is operated in a constant voltage control mode so that the output voltage is identical to the setting voltage Vchg. To the contrary, when due to some reasons, the charging current is increased to be greater than the setting current Ichg during operation in the constant voltage control mode, the battery charger 51 is operated in a constant current control mode so that the output current is identical to the setting current Ichg.

In the battery charger 51, the setting current Ichg and the setting voltage Vchg are dynamically changed during charging in accordance with the instructions from the EC 13. However, the setting current Ichg will not exceed the standard maximum charging current value Imax 1, and the setting voltage Vchg will not exceed the standard upper charging voltage limit Vmax1. Therefore, the battery charger 51 being operated in the constant current control mode means that the setting current is set to a preset setting current Ichg, the battery charger is operated with an output current corresponding to the preset setting current Ichg in a constant current control method, while when the setting current is changed to another setting current Ichg, it is operated with a changed output current value in a constant current control method.

The EC 13 is an integrated circuit that controls many hardware elements of the notebook PC 10 as well as a power supply. The EC 13 can communicate with the battery packs 100 and 101 to thereby acquire information such as the surface temperature, battery voltage, charging current, charging power, discharging power, and remaining capacity of the battery cell generated by the battery packs 100 and 101 and the setting voltage Vchg and setting current Ichg set by the battery charger. The EC 13 delivers instructions to the reference voltage source 55 to activate or stop the battery charger 51 in accordance with the instruction from the battery packs 100 and 101. For example, when the EC 13 is instructed by the battery packs to set the setting voltage Vchg and the setting current Ichg to zero, values of zero are programmed to the voltage setting value input Vset and the current setting value input Iset, and the operation of the battery charger 51 is stopped. When the battery charger 51 starts an operation, the EC 13 having received the instructions from the battery packs 100 and 101 programs the setting voltage Vchg and the setting current Ichg to the voltage setting value input Vset and the current setting value input Iset.

A DC/DC converter 53 converts the DC voltage supplied from the AC/DC adapter 11 or the battery packs 100 and 101 to a predetermined voltage and supplies the converted voltage to a system load in the notebook PC 10. Examples of the system load include a variety of devices such as a CPU, a liquid crystal display, a wireless module, a hard disc drive, or a controller. An FET-A and an FET-B are switches for controlling charging/discharging of the main battery pack 100 and are connected to a charging/discharging circuit of the main battery pack 100. An FET-C and an FET-D are switches for controlling charging/discharging of the auxiliary battery pack 101 and are connected to a charging/discharging circuit of the auxiliary battery pack 101.

An FET-E is a switch that is connected between the battery packs 100 and 101 and the DC/DC converter 53 for forming a discharging circuit from the battery packs 100 and 101 to the DC/DC converter 53. An FET-F is connected to a circuit for supplying electric power from the AC/DC adapter 11 to the DC/DC converter 53. That is, the FET-F is a switch for temporarily supplying electric power from the battery packs 100 and 101 to the DC/DC converter 53 in order to perform so-called peak shifting wherein the switch suppresses the peak of an AC power source by interrupting the supply of electric power from the AC power source while electric power is being supplied from the AC/DC adapter 11 to the DC/DC converter 53. An FET drive circuit 15 controls the FET-A to the FET-F in accordance with the instructions from the EC 13.

Figure 2:
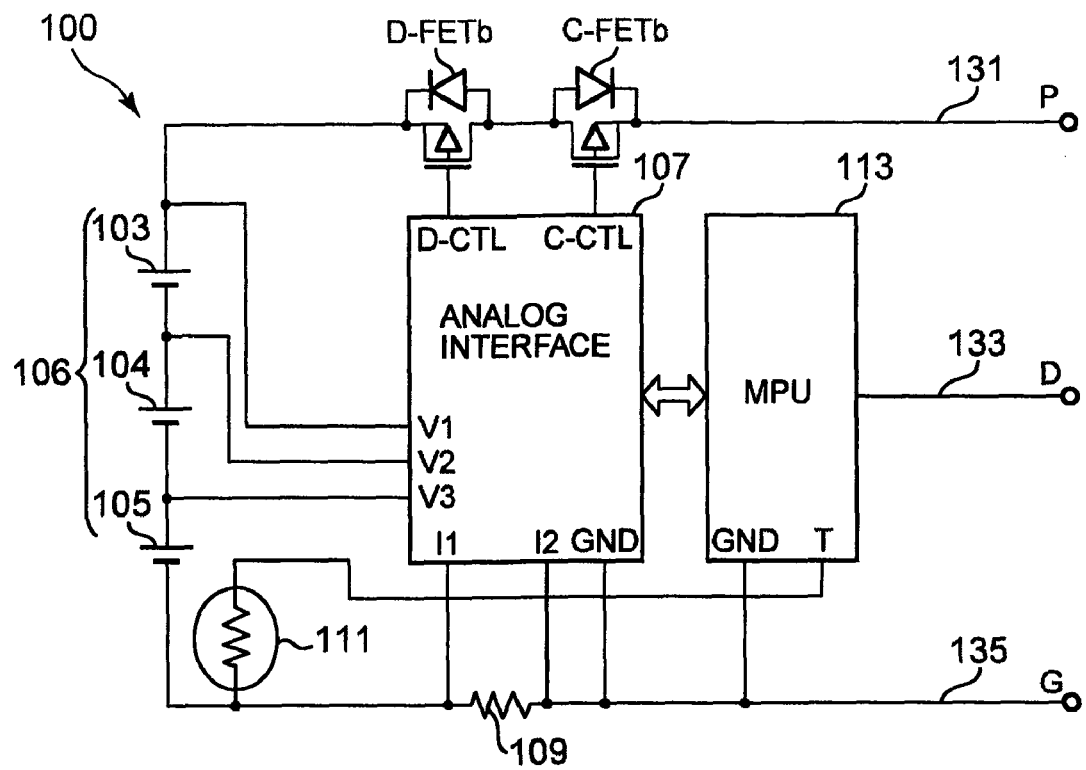
FIG. 2 is a block diagram illustrating an example of the battery pack according to the present embodiment.

FIG. 2 is a block diagram illustrating an internal construction of the battery pack 100 in compliance with the smart battery system (SBS) standards according to the embodiment of the present invention. The battery pack 101 has the same construction as the battery pack 100. The battery pack 100 has a power supply line 131, a communication line 133, and a ground line 135, which are respectively connected to a P terminal, a D terminal, and a G terminal of the notebook PC 10. To the power supply line 131, a charge protection switch C-FETh and a discharge protection switch D-FETh, which are configured by p-type MOS-FETs, are connected in series. To the discharge protection switch D-FETh, a battery set 106 having therein three lithium ion battery cells 103 to 105 are connected in series. The discharging current from the battery set 106 and the charging current to the battery set 106 flows between the notebook PC 10 and the battery set 106 via a charging/discharging circuit formed by the power supply line 131 and the ground line 135.

The terminals of the battery set 106 at the voltage side of the battery cells 103 to 105 are connected to analog input terminals V1 to V3 of an analog interface 107. A temperature element 111 such as one or plural thermistors is attached on the surface of the battery set 106. The temperature element 111 is configured to measure the surface temperature of the battery cells 103 to 105, and the output of the temperature element 111 is connected to a T terminal of an MPU 113. The surface temperature may be measured in a contact manner wherein a sensor is contacted to a housing of the battery cells 103 to 105 or by a non-contact manner wherein the sensor is separate from the housing. A current sense resistor 109 is connected to the ground line 135 between the negative terminal and the G terminal of the battery cell 105. Both ends of the current sense resistor 109 are connected to the I1 and I2 terminals of the analog interface 107.

The analog interface 107 includes analog input terminals V1, V2, and V3 for acquiring the respective cell voltages of the battery cells 103 to 105 and analog input terminals I1 and I2 for acquiring potential difference across the current sense resistor 109. The analog interface 107 also includes analog output terminals C-CTL and D-CTL for outputting signals that control turning on/off of the charge protection switch C-FETb and the discharge protection switch D-FETb. The analog interface 107 measures the cell voltages of the battery set 106, converts the measurement values into digital values, and delivers the converted values to the MPU 113.

The analog interface 107 measures the charging current and the discharging current flowing in the battery set 106 from the voltage detected by the current sense resistor 109, converts the measurement values into digital values, and delivers the converted values to the MPU 113. The MPU 113 is an integrated circuit in which in addition to an 8 to 16 bit CPU, a RAM, a ROM, a flash memory, and a timer are integrated into one package. The MPU 113 is configured to be able to communicate with the analog interface 107, and calculates the amount of charged or discharged electricity based on the voltage or current measurement values related to the battery set 106, delivered from the analog interface 107, and calculates a full charge capacity to be stored in a flash memory.

Moreover, the MPU 113 has an overcurrent protection function, an overvoltage protection function (also referred to as overcharge protection function), and an undervoltage protection (also referred to as overdischarge protection function). Upon detection of an abnormality in the battery cells 103 to 105 from the voltage or current measurement value delivered from the analog interface 107, the MPU 113 turns off either or both of the charge protection switch C-FETh and the discharge protection switch D-FETh via the analog interface 107. The overcurrent protection function, the overvoltage protection function, and the undervoltage protection function are implemented as a program that is executed by the MPU 113.

The communication line 133 from the MPU 23 is connected to the EC 13 of the notebook PC 10 via the D terminal, so that the MPU 113 can communicate with the EC 13. A clock line is included in the communication line 133. The MPU 113 transmits the values of the setting current Ichg and the setting voltage Vchg, which are to be programmed in the battery charger 51, to the EC 13. Then, the EC 13 programs the setting values into the battery charger 51 via the reference voltage source 55 to thereby activate or stop the operation of the battery charger 51.

Figure 3:
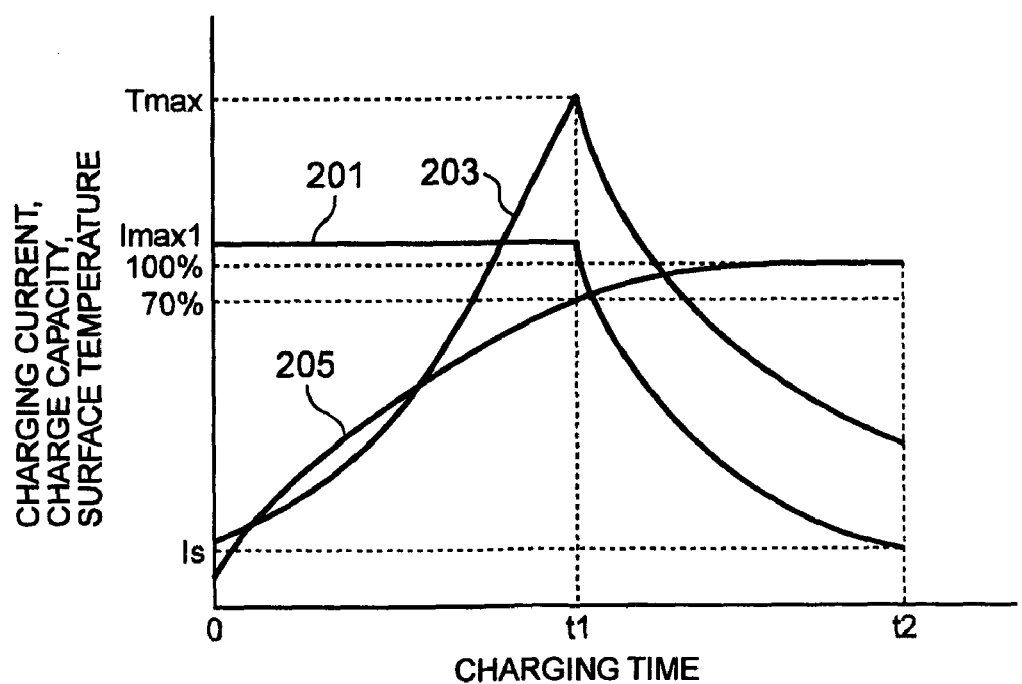
FIG. 3 is a diagram for explaining the maximum surface temperature.

FIG. 3 is a diagram showing the variations in the charging current, charging amount, and surface temperature with the lapse of the charging time, when the surface temperature belongs to the standard temperature range and when the battery charger 51 is charging the battery set 106 with the setting current Ichg set to the standard maximum charging current value Imax1. In the drawing, line 201 shows the charging current supplied from the battery charger 51 to the battery set 106; line 203 shows the surface temperature of the battery cells 103 to 105; and line 205 shows the charging amount. Here, the charging amount (Ah) refers to the amount of electricity stored in the battery set 106 and corresponds to the sum of the amount of electricity remaining before charging and the amount of electricity injected by the charging. The amount of electricity injected by charging is a value obtained by integrating the charging current during charging by the charging time.

The battery charger 51 performs a switching operation such that the output current and output voltage do not exceed a setting current Ichg and a setting voltage Vchg regardless of the values of the setting current Ichg and the setting voltage Vchg. Since a large charging current flows through the battery set 106 in the initial stage of charging, when the battery charger 51 starts charging at time 0 as shown in FIG. 3, the battery charger 51 is operated with an output current of the standard maximum charging current value Imax1 by a constant current control method. With the progress of the charging, the surface temperature of the battery cells 103 to 105 increases as indicated by the line 203, and the charging amount increases as indicated by the line 205. Moreover, when the terminal voltage of the battery set 106 increases so that the output voltage of the battery charger 51 reaches the setting voltage Vchg at time t1, the battery charger 51 transitions to a constant voltage control mode so that the output voltage is identical to the setting voltage Vchg.

Thereafter, the charging current decreases with the progress of the charging. However, upon detection of the charging current reaching a preset charge stop current value Is, the MPU 113 instructs the battery charger 51 to stop the charging at time t2. The charging amount stored in the battery set 106 at time t2 is referred to as the full charge capacity. The full charge capacity corresponds to the maximum amount of dischargeable electricity that the battery set 106 can accumulate at the present moment. The full charge capacity has a value that decreases with aging. The surface temperature of the battery cell becomes the maximum at time t1 at which the constant current control mode switches to the constant voltage control mode and is about 7 degrees higher than that before starting the charging. When the charging is performed with the standard maximum charging current value Imax1, the charging amount at time t1 at which the constant current control mode switches to the constant voltage control mode is substantially constant and corresponds to about 70 percents of the full charge capacity.

The ratio of the charging amount that is actually stored in the battery set 106 to the full charge capacity is referred to as an RSOC (%) (relative state of charge). In FIG. 3, the surface temperature of the battery cell reaches the maximum surface temperature value Tmax when the RSOC (%) is 70 percents. Moreover, when the surface temperature has reached the maximum surface temperature value Tmax, it is highly likely that the surface temperature of the battery cells 103 to 105 exceeds the upper limit T3 of the standard temperature range and belongs to the high temperature range. However, the surface temperature of the battery cells 103 to 105 can reach the maximum surface temperature value Tmax with the RSOC (%) of 70 percents only when the charging current is the standard maximum charging current value Imax1. Therefore, when the setting current Ichg is changed and the battery charger 51 performs charging with an output current other than the standard maximum charging current value Imax1, the RSOC (%) corresponding to the maximum surface temperature value Tmax may have a different value from 70 percent.

As shown in FIG. 1, the AC/DC adapter 11 is capable of charging the battery set 106 by supplying electric power to the battery charger 51 while supplying electric power to a system load via the DC/DC converter 53. In this case, depending on the capacity of the AC/DC adapter 11, when the consumption power of the system load is large, the output voltage of the AC/DC adapter 11 may decrease, with the result that even when a setting current Ichg of 0.7 ItA is set to the current setting value input Iset of the battery charger 51, the battery charger 51 can practically output an output current less than 0.7 ItA. Therefore, the RSOC (%) corresponding to the maximum surface temperature value Tmax may change when the charging current varies due to such a reason.

Figures 4A, 4B:
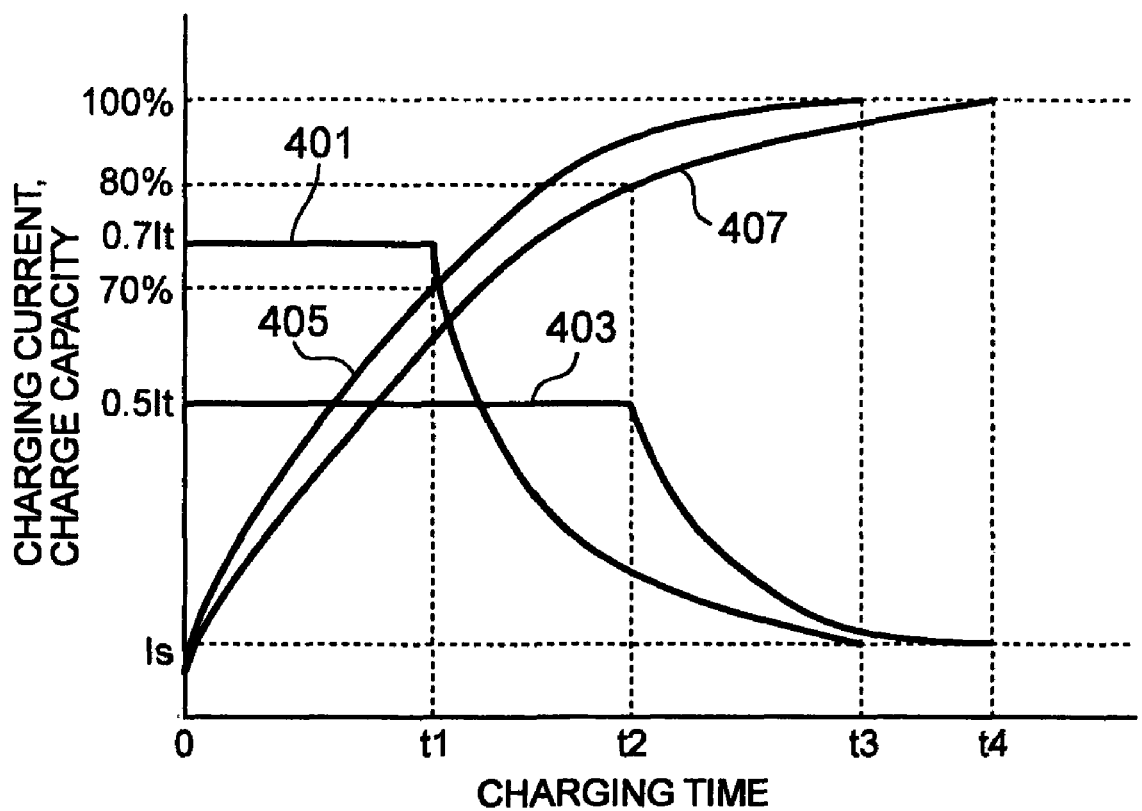
FIGS. 4A and 4B are diagrams for explaining a corrected RSOC (%)

FIG. 4A is a diagram for explaining the relationship between the change in the charging current and the RSOC (%) for reaching the maximum surface temperature value Tmax. In the drawing, line 401 shows the time characteristics of the charging current when the setting current Ichg is set to 0.7 ItA, and line 403 shows the time characteristics of the charging current when the setting current Ichg is set to 0.5 ItA Moreover, line 405 shows the time characteristics of the charging amount corresponding to the line 401, and line 407 shows the time characteristics of the charging amount corresponding to the line 403. Referring to the line 401, the charging mode switches from the constant current control mode to the constant voltage control mode at time t1, and the charging is completed at time t3. Referring to the line 403, the charging mode switches from the constant current control mode to the constant voltage control mode at time t2 later than time t1, and the charging is completed at time t4 later than t3.

As described with reference to FIG. 3, when charging is performed in the constant-current/constant-voltage manner, the surface temperature reaches the maximum surface temperature value Tmax at time t1 at which the constant current control mode transitions to the constant voltage control mode. The RSOC (%) at time t1 is 70 percents. However, when charging is performed with a charging current of 0.5 ItA, the period wherein the battery charger 51 is operated in the constant current control mode is long, and the time t2 at which the surface temperature reaches the maximum surface temperature value Tmax is later than time t1. Moreover, the RSOC (%) at time t2 is 80 percents. In this manner, when the charging current in the constant current control period decreases, the transition time to the constant voltage control mode is delayed, with the result that the value of the RSOC (%) for reaching the maximum surface temperature value Tmax becomes large.

Therefore, the value of the RSOC (%) corresponding to the maximum surface temperature value Tmax needs to be corrected when charging is performed with a charging current different from the standard maximum charging current value Imax 1. The RSOC (%) corresponding to the maximum surface temperature value Tmax corrected in accordance with the charging current will be referred to as corrected RSOC (%). FIG. 4B shows an example of the correction table 409 that stores the results of the RSOC (%) corresponding to the maximum surface temperature value Tmax when charging is performed with the standard maximum charging current value Imax1, corrected in accordance with the actual charging current value. Referring to the correction table 409, as the charging current decreases from 0.7 ItA, the corrected RSOC (%) increases. The correction table 409 is stored in the ROM of the MPU 113 and can be referenced by the MPU 113.

Here, although the corrected RSOC (%) increased as the charging current decreases, the maximum surface temperature value Tmax corresponding to the corrected RSOC (%) is also decreased. This is because assuming the internal resistance of the battery set 106 be R, the amount of heat generated from the battery set is calculated by multiplying the internal resistance R by the square of the charging current; therefore, the amount of heat generation decreases as the charging current decreases.

When the setting voltage Vchg is lowered to the high-temperature upper charging voltage limit Vmax3 in accordance with the safety guidelines when the surface temperature of the battery cells 103 to 105 belongs to the high temperature range, the battery charger 51 cannot charge the battery set 106 up to the full charge capacity. Moreover, when the surface temperature of the battery cells 103 to 105 belongs to the high temperature range while charging is performed with the standard maximum charging current value Imax1 in a constant voltage control mode and when the setting current Ichg is lowered to the high-temperature maximum charging current value Imax3, the subsequent charging current becomes insufficient, increasing the charging time. Therefore, the charging cannot be performed up to the full charge capacity by the time when the notebook PC is used for mobile use.

Figure 9A:
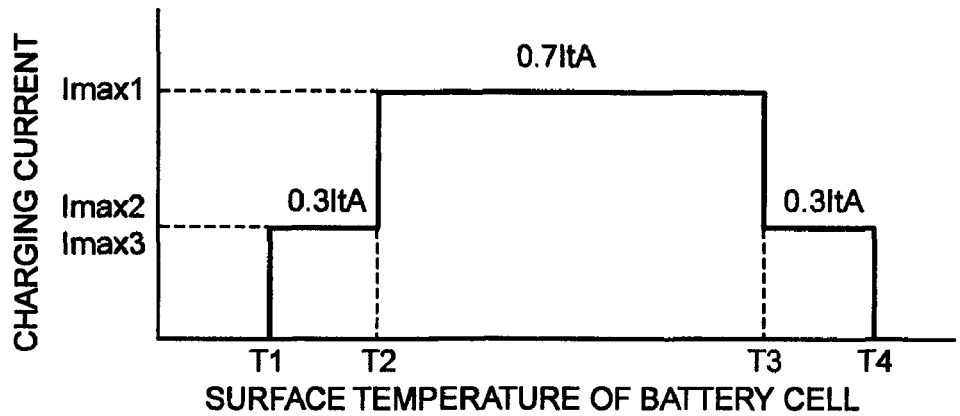
FIGS. 9A and 9B are diagrams illustrating the relationship between the maximum values of the charging voltage and current and the surface temperature of the battery cell.
Figure 9B:
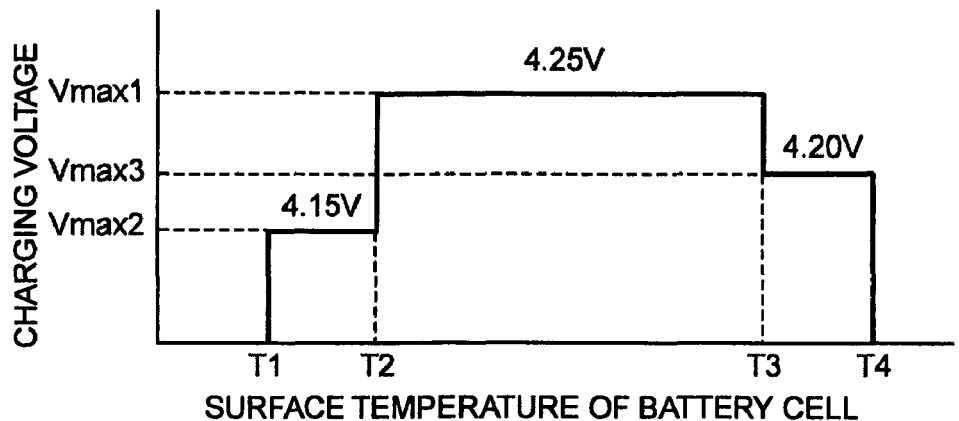

Here, the upper charging voltage limits in the temperature ranges shown in FIGS. 9A and 9B are the voltage of the battery cells 103 to 105, and the setting voltage Vchg of the battery charger 51 is determined considering the number of battery cells connected in series and the output error of the battery charger 51. In the present specification, the setting voltage Vchg of the battery charger 51 being set to the standard upper charging voltage limit Vmax1 means that the setting voltage Vchg is set to a value in consideration of the output error of the battery charger 51 such that the upper charging voltage limit of the battery cells 103 to 105 is maintained at a level smaller than the standard upper charging voltage limit Vmax1. The above statement is similarly applied to other temperature ranges.

Figure 5:
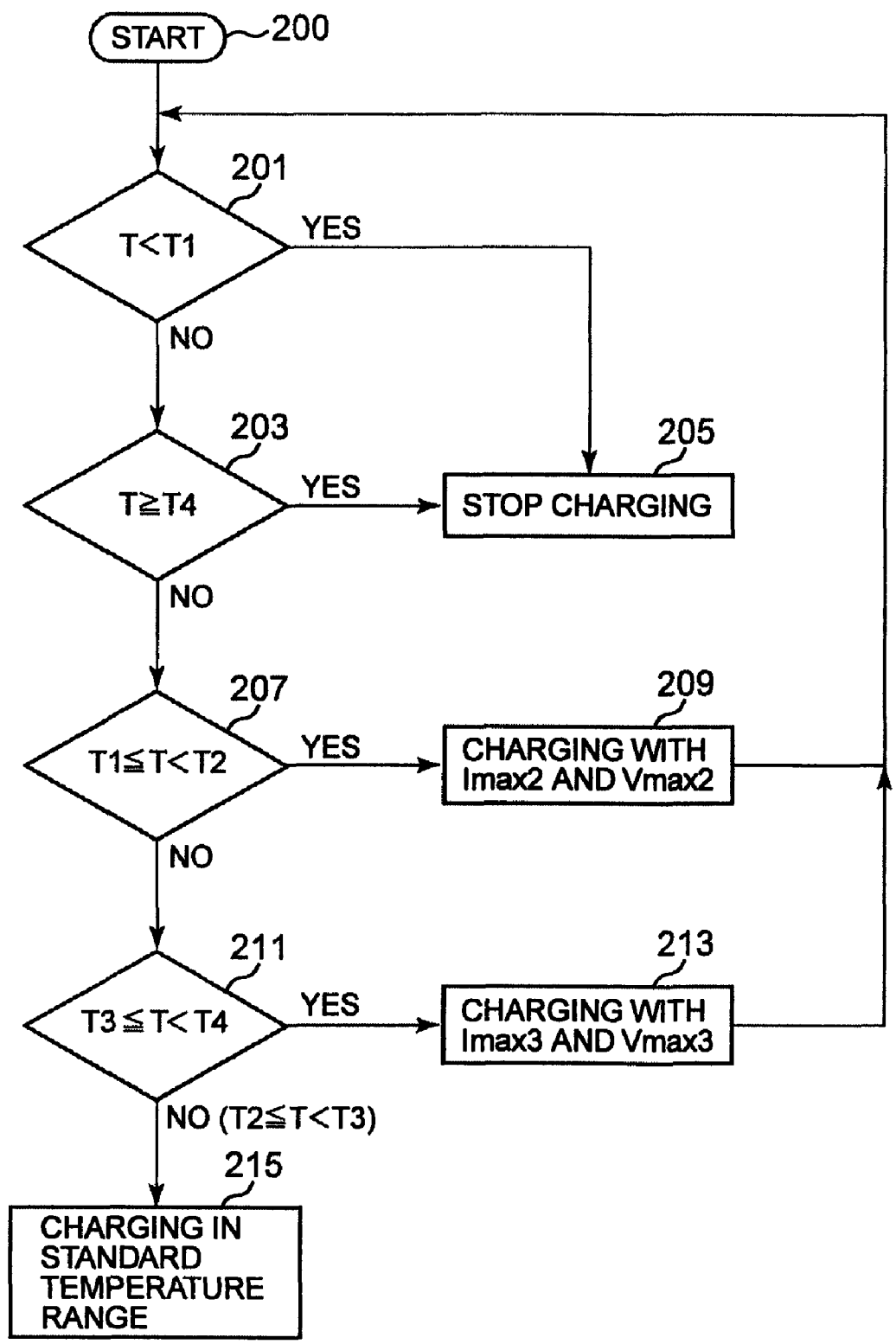
FIG. 5 is a flow chart illustrating the procedures for charging a battery pack.
Figure 6:
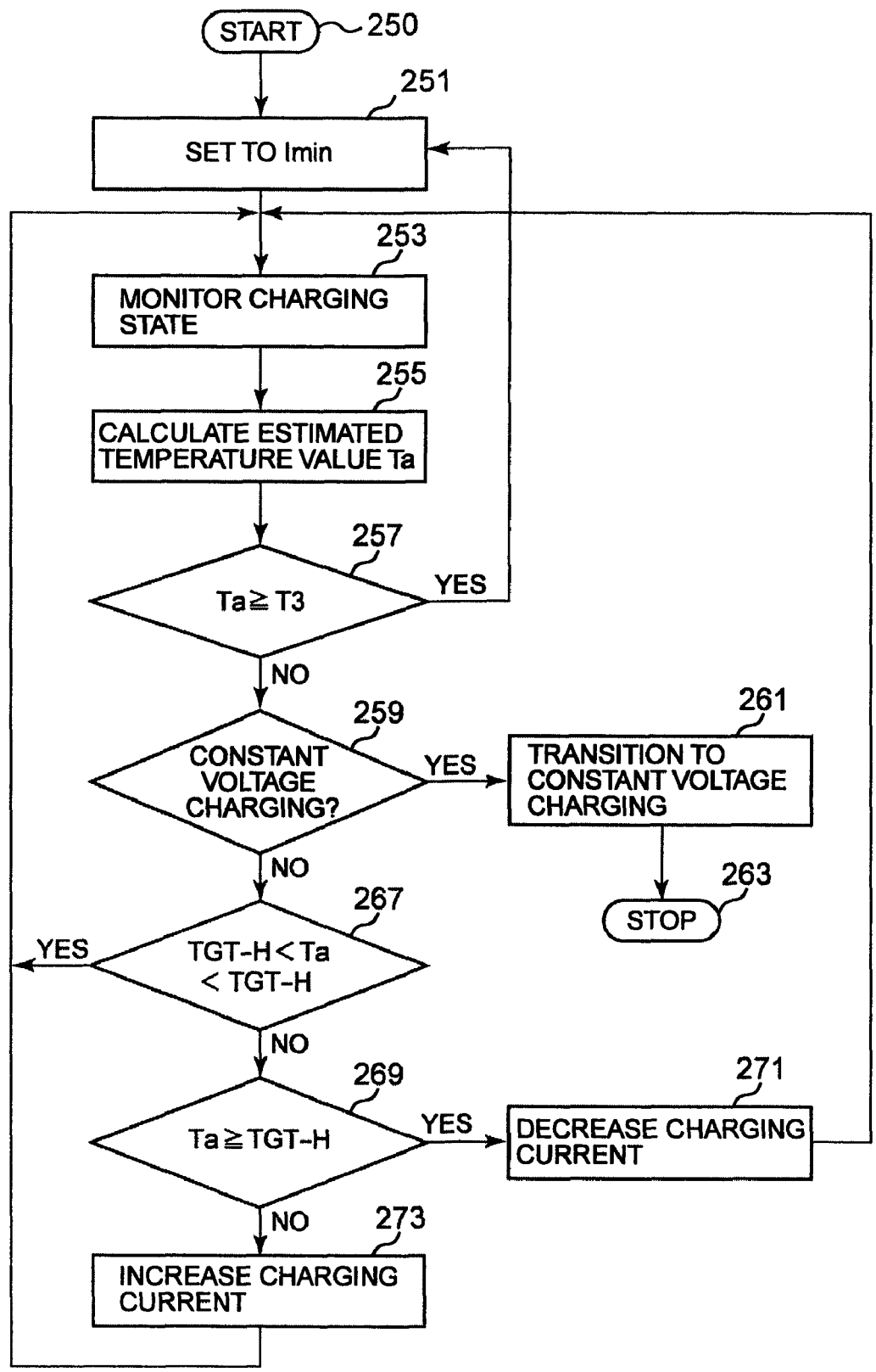
FIG. 6 is a flow chart illustrating the procedures for charging a battery pack.
Figure 7A:
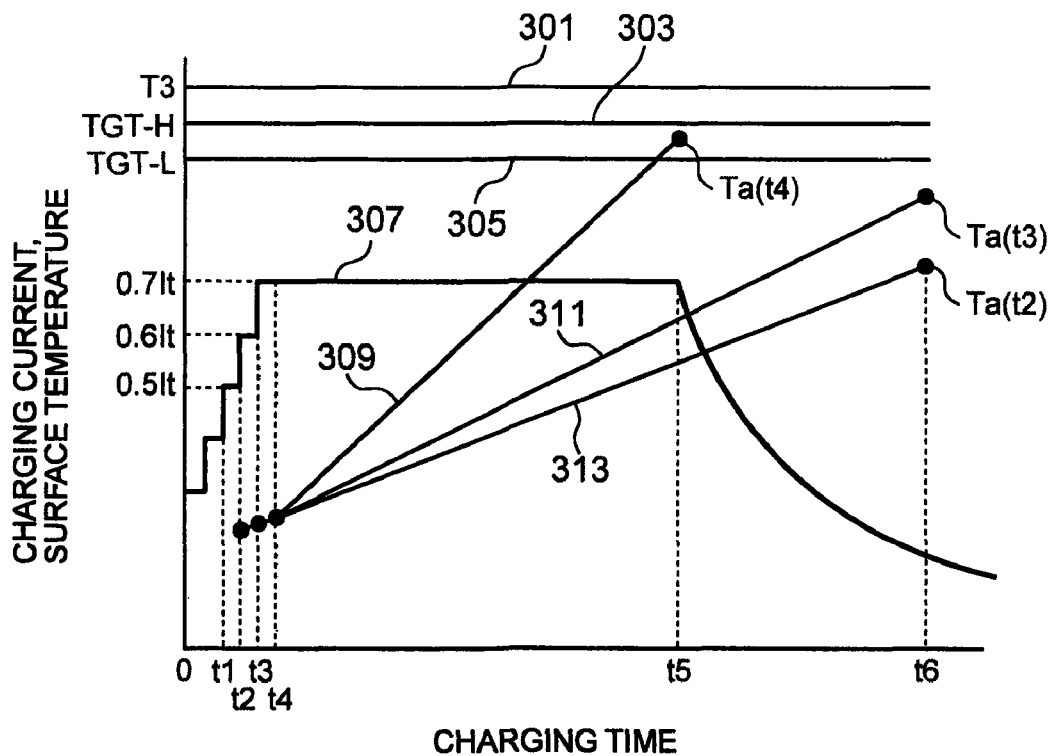
FIGS. 7A and 7B are diagrams illustrating examples of the change in an estimated temperature value and a charging current.
Figure 7B:
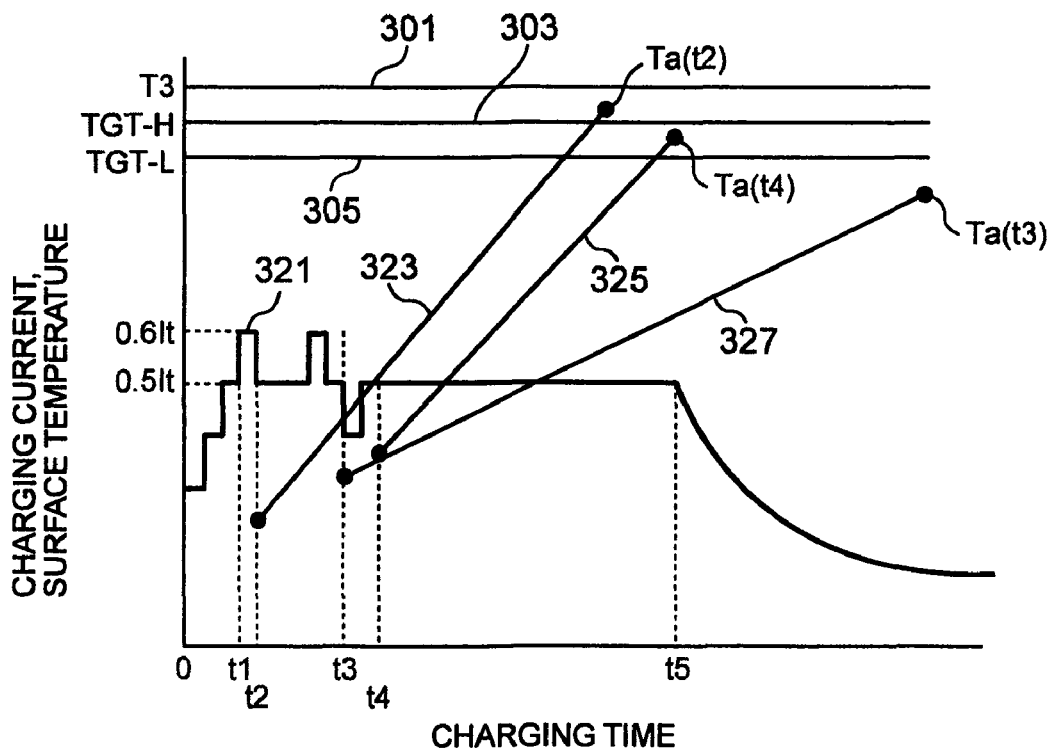

FIGS. 5 and 6 are flow charts illustrating the charging procedures in the notebook PC 10 and the battery pack 100, in which both or either one of the high-temperature upper charging voltage limit Vmax3 and the high-temperature maximum charging current value Imax3 is limited to a value lower than those of the standard temperature range, thereby solving the problem that charging cannot be performed up to the full charge capacity and that the charging time increases. The procedures of FIGS. 5 and 6 are principally executed by a charging program stored in the ROM of the MPU 113. FIGS. 7A and 7B are diagrams illustrating examples of the variations in the charging current when the charging procedures of FIG. 6 are executed.

Referring to FIG. 5, in block 200, the battery charger 51 starts charging when the MPU 113 issues a charging request to the EC 13 in a state where the AC/DC adapter 11 is connected to the notebook PC 10 and the battery pack 100 is attached to the battery bay. The control of the starting and stopping of charging and the setting of the setting current Ichg and setting voltage Vchg with respect to the battery charger 51 are all carried out by the MPU 113 instructing the EC 13 to do so. The consumption power of the system load of the notebook PC 10 may change independently from the procedures of FIGS. 5 and 6. At this point of time, the setting current Ichg and the setting voltage Vchg are set to the standard maximum charging current value Imax1 and the standard upper charging voltage limit Vmax1, respectively.

In block 201, the MPU 113 measures the surface temperature T of the battery cells 103 to 105 to determine whether or not the measured surface temperature T is lower than a lower charging temperature limit T1. When the surface temperature T1 is lower than the lower charging temperature limit T1, the charging is stopped and a standby mode is started in block 205. When the surface temperature T is not less than the lower charging temperature limit T1, the flow proceeds to block 203, where the MPU 113 determines whether or not the surface temperature T is equal to or higher than the upper charging temperature limit T4. When the surface temperature T is equal to or higher than the upper charging temperature limit T4, the charging is stopped and a standby mode is started in block 205. When the surface temperature T is lower than the upper charging temperature limit T4, the flow proceeds to block 207, where the MPU 113 determines whether or not the surface temperature T belongs to the low temperature range.

When the surface temperature T belongs to the low temperature range, the flow proceeds to block 209, where the MPU 113 activates the battery charger 51 by setting the setting current Ichg and the setting voltage Vchg of the battery charger 51 to the low-temperature maximum charging current value Imax2 and the low-temperature upper charging voltage limit Vmax2 shown in FIGS. 9A and 9B, respectively. When the surface temperature T is outside the low temperature range, the flow proceeds to block 211, where the MPU 113 determines whether the surface temperature T belongs to the high temperature range. When the surface temperature T belongs to the high temperature range, the flow proceeds to block 213, where the MPU 113 activates the battery charger 51 by setting the setting current Ichg and the setting voltage Vchg of the battery charger 51 to the high-temperature maximum charging current value Imax3 and the high-temperature upper charging voltage limit Vmax3 shown in FIGS. 9A and 9B, respectively. When it is determined in block 211 that the surface temperature T is outside the high temperature range, since the surface temperature T belongs to the standard temperature range, the flow proceeds to block 215, where the MPU 113 starts the procedures of FIG. 6.

In block 250 of FIG. 6, although the MPU 113 determines that the surface temperature T belongs to the standard temperature range, since there are a variety of charging conditions that have influence on the internal temperature of the battery pack such as the surface temperature T at the charge start time or the operation state of the notebook PC 10, the surface temperature T during charging is influenced by the charging conditions. Moreover, as described above, the amount of temperature rise attributable to the charging increases as the charging current increases. The procedures illustrated in FIG. 6 cause the MPU 113 to be able to dynamically change the setting current Ichg of the battery charger 51 so that the surface temperature T does not exceed the upper limit T3 of the standard temperature range in any charging condition and even when the charging condition is abruptly changed.

In order to perform charging so that the surface temperature T does not exceed the upper limit T3 of the standard temperature range, according to the present embodiment, as shown in FIGS. 7A and 7B, a target temperature range defined by boundaries of an upper target temperature limit TGT-H and a lower target temperature limit TGT-L is established within the range of the standard temperature range. As an example, when the upper limit T3 of the standard temperature range is 45 degrees, the upper target temperature limit TGT-H is set to a value ranging from 44 to 43 degrees and the lower target temperature limit TGT-L is set to a value ranging from 42 to 41 degrees.

When the upper target temperature limit TGT-H is too close to the upper limit T3 of the standard temperature range, it is highly likely for the surface temperature to exceed the upper limit T3 of the standard temperature range, and therefore, it is not desirable. This is particularly so when the consumption power of the system load increases abruptly to increase the ambient temperature in a housing of the battery pack. On the other hand, when the upper target temperature limit TGT-H is too distant from the upper limit T3 of the standard temperature range, the charging current is not necessarily decreased much to increase the charging time, and therefore, it is not desirable. Moreover, if the width of the target temperature range is too small, the setting current Ichg is changed too frequently, while if the width of the target temperature range is too large, charging is continued with the unnecessarily decreased charging current, both of which are not desirable.

Therefore, it is preferable that the upper target temperature limit TGT-H is set to a value that is one to three degrees lower than the upper limit T3 of the standard temperature range and that the width of the target temperature range is set to a value ranging from one to three degrees. The upper target temperature limit TGT-H and the lower target temperature limit TGT-L are programmed into the charging program executed by the MPU 113 or stored as a table in a flash memory so that the MPU 113 can use the temperature values.

In block 251, the MPU 113 sets the setting current Ichg of the battery charger 51 to a preset minimum charging current value Imin while setting the setting voltage Vchg to the standard upper charging voltage value Vmax1. The minimum charging current value Imin has such a small value that the surface temperature T does not exceed the upper limit T3 of the standard temperature range in a normal charging condition. The minimum charging current value Imin is selected from between 0.2 ItA and 0.3 ItA, for example.

In block 253, by monitoring the charging state for one minute set as a monitoring time Δt with the minimum charging current value Imin, the MPU 113 calculates an average value of the charging current during the monitoring time Δt to thereby calculate the value of the corrected RSOC (%) corresponding to the average charging current value Imean by referring to the correction table 409. The corrected RSOC (%) corresponds to a charging amount for reaching the maximum surface temperature value Tmax under assumption that the charging is continued with the calculated mean charging current value Imean. The MPU 113 estimates the maximum surface temperature value Tmax under assumption that the charging is continued with the average charging current value mean up to the corrected RSOC (%). Since it is known that the surface temperature T increases approximately linearly up to the corrected RSOC (%), the maximum surface temperature value Tmax can be estimated by calculating a time increase rate ΔT/t of the surface temperature T per the monitoring time Δt and the time required for charging up to the charging amount corresponding to the corrected RSOC (%).

The MPU 113 has stored in the flash memory, the present full charge capacity and the present charging amount based on the previous charging and discharging amount. The MPU 113 can calculate the charging amount corresponding to the corrected RSOC (%) by multiplying the present full charge capacity by the corrected RSOC (%) obtained from the correction table 409 shown in FIG. 4B. Assuming the present charging amount be C1 (Ah) and the charging amount corresponding to the corrected RSOC (%) be C2 (Ah), the charging time t required for charging up to the corrected RSOC (%) with the average charging current value Imean can be calculated by t=(C2−C1)/Imean.

Assuming ΔT be the difference between the surface temperature T at the start of the monitoring time Δt and the surface temperature T at the end thereof, the time increase rate ΔT/t of the surface temperature T can be calculated. Moreover, by multiplying the time increase rate ΔT/t by the charging time t and then adding the surface temperature at the estimation time to the multiplication result, it is possible to estimate the maximum surface temperature value Tmax when charging is performed with the average charging current value Imean up to the corrected RSOC (%). The maximum surface temperature value Tmax estimated by the MPU 113 will be referred to as an estimated temperature value Ta.

FIGS. 7A and 7B are diagrams illustrating examples of the variations in the charging current when the above-described charging procedures are executed. Specifically, FIG. 7A shows the case where charging is performed with the standard maximum charging current value Imax1 in the standard temperature range since the surface temperature T at the charge start time is low. FIG. 7B shows the case where charging is performed with a charging current lower than the standard maximum charging current value Imax1 since the surface temperature T at the charge start time is high. When the procedures of FIG. 6 are executed, the setting current Ichg is dynamically changed unlike the case shown in FIG. 3, where a constant setting current Ichg is set to the battery charger 51 in the constant current control period.

Referring to FIGS. 7A and 7B, the target temperature range defined by boundaries of the upper target temperature limit TGT-H indicated by line 303 and the lower target temperature limit TGT-L indicated by line 305 is established just below the upper limit T3 of the standard temperature range indicated by line 301. Moreover, lines 307 and 321 represent the charging current flowing through the battery set 106 when the procedures of FIG. 6 are executed. The respective intervals between time t1 and time t4 correspond to an example of the monitoring time Δt. In FIG. 7A, the average charging current value mean measured by the MPU 113 between time t1 and time t2 is 0.5 ItA.

The MPU 113 calculates at time t2 the temperature rise ΔT during a previous monitoring time Δt from the difference between the surface temperature at time t2 and the surface temperature at time t1. Time t6 is the time at which the corrected RSOC (%) is reached when charging is performed with a charging current of 0.5 ItA. The MPU 113 calculates an estimated temperature value Ta (t2) at time t6 by calculating the charging time required for reaching the corrected RSOC (%) by the subtraction of t6−t2 and calculating the charging amount corresponding to the corrected RSOC (%) from the full charge capacity.

Line 313 is a straight line that passes through the present surface temperature at time t2 and has a slope corresponding to the time increase rate ΔT/t of the surface temperature T, showing the time characteristics of the surface temperature T which is estimated when charging is performed up to time t6 with the average charging current value Imean measured during the monitoring time Δt between time t1 and time t2. The estimated temperature value Ta (t2) is lower than the target temperature range. Referring to FIG. 7A, similarly, line 311 shows the leading part of a straight line of the estimated temperature value Ta (t3) calculated at t3 by the MPU 113, and line 309 shows the leading part of a straight line of the estimated temperature value Ta (t4) calculated at t4 by the MPU 113. Referring to the line 311, since the average charging current value Imean during the monitoring time Δt just before time t3 is 0.6 ItA, the estimated temperature value Ta (t3) is higher than the estimated temperature value Ta (t2).

Referring to the line 309, since the average charging current value Imean during the monitoring time Δt just before time t4 is 0.7 ItA, the estimated temperature value Ta (t4) is higher than the estimated temperature value Ta (t3). Referring to FIG. 7B, similarly, line 323 shows the leading part of a straight line of the estimated temperature value Ta (t2) calculated at t2 by the MPU 113; line 327 shows the leading part of a straight line of the estimated temperature value Ta (t3) calculated at t3 by the MPU 113; and line 325 shows the leading part of a straight line of the estimated temperature value Ta (t4) calculated at t4 by the MPU 113.

Subsequently, in block 257, the MPU 113 determines whether or not the estimated temperature value Ta is equal to or higher than the upper limit T3 of the standard temperature range. When the procedures of FIG. 6 are continued, there may be a case where the ambient temperature or the consumption power of the system load changes abruptly, whereby the estimated temperature value Ta exceeds the upper limit T3 of the standard temperature range. Therefore, when the MPU 113 determines that the estimated temperature value Ta is equal to or higher than the upper limit T3 of the standard temperature range, the flow returns to block 251, where the MPU 113 sets the setting current Ichg of the battery charger 51 to the minimum charging current value Imin. As a result, the estimated temperature value Ta decreases, thereby preventing a case where the surface temperature T exceeds the upper limit T3 of the standard temperature range.

When the MPU 113 determines that the estimated temperature value Ta is lower than the upper limit T3 of the standard temperature range, the flow proceeds to block 259. In block 259, the determination is not made solely by the MPU 113 but is made based on the setting current Ichg and the setting voltage Vchg of the battery charger 51. Specifically, when the charging of the battery set 106 is progressed and the output voltage of the battery charger 51 is identical to the setting voltage Vchg, the flow proceeds to block 261, the battery charger 51 is operated in the constant voltage control mode so that the output voltage is identical to the setting voltage Vchg. Moreover, when the MPU 113 determines that the charging current has reached the charge stop current value Is, the operation of the battery charger 51 is stopped in block 263.

Figure 8:
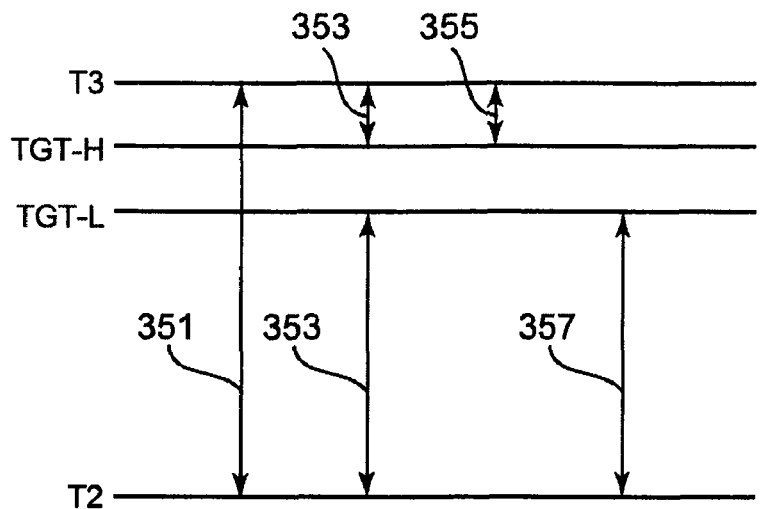
FIG. 8 is a diagram for explaining a temperature range.

Referring to FIGS. 7A and 7B, the battery charger 51 switches its operation at time t5 from the constant current control mode to the constant voltage control mode. In FIG. 7A, the operation mode transitions to the constant voltage control mode after the charging is performed with the standard maximum charging current value Imax1. On the other hand, in FIG. 7B, the operation mode transitions to the constant voltage control mode after the charging is performed with a charging current lower than the standard maximum charging current value Imax1 over the entire constant current control period. Since the charging current decreases once it is switched to the constant voltage control mode, the surface temperature T decreases as shown in FIG. 3. FIG. 8 shows the range of the estimated temperature value Ta determined by the procedures of FIG. 6. A temperature range 351 is the range of the estimated temperature value Ta when the flow proceeds from block 257 to block 259.

Subsequently, in block 267, the MPU 113 determines whether or not the estimated temperature value Ta belongs to the target temperature range. Since the target temperature range is established just below the upper limit T3 of the standard temperature range, the estimated temperature value Ta being lower than the upper target temperature limit TGT-H has the following meaning. That is, even when the surface temperature of the battery cells 103 to 105 under assumption that charging is performed with the present charging current value Imean up to the corrected RSOC (%) has reached the maximum surface temperature value Tmax, the maximum surface temperature does not exceed the upper limit T3 of the standard temperature range. Moreover, since the estimated temperature value Ta is higher than the lower target temperature limit TGT-L, the charging current is not too low.

Therefore, since it is best to continue the charging with the present setting current Ichg as long as the condition of block 267 is satisfied, the MPU 113 returns to the operation of block 253. This aspect of the charging control is shown by the line 309 of FIG. 7A and the line 325 of FIG. 7B. At periods later than time t4 in FIG. 7A and time t4 in FIG. 7B, the charging current is not changed since the MPU 113 has proceeded to block 253. When the MPU 113 determines in block 267 that the estimated temperature value Ta is outside the target temperature range, the flow proceeds to block 269, where it is determined whether or not the surface temperature value Ta is equal to or higher than the upper target temperature limit TGT-H. In FIG. 8, a temperature range 353 is the range of the estimated temperature value Ta when the flow proceeds from block 267 to block 269.

When the MPU 113 determines that the estimated temperature value Ta is equal to or higher than the upper target temperature limit TGT-H, the estimated temperature value Ta falls between the upper target temperature limit TGT-H and the lower limit T3 of the high temperature range. In such a case, there can be expected a case where when the charging is continued with the average charging current value mean during this monitoring time Δt, the maximum surface temperature value Tmax exceeds the upper limit T3 of the standard temperature range due to a change in the ambient temperature or the consumption power of the system load. Therefore, the MPU 113 proceeds to block 271, where the setting current Ichg of the battery charger 51 is changed to decrease the charging current, and thereafter, the operation of block 253 is performed. In FIG. 8, a temperature range 355 is the range of the estimated temperature value Ta when the flow proceeds from block 269 to block 271.

The charging current value may be decreased by predetermined number of steps by setting a plurality of steps to the setting current Ichg of the battery charger 51. This aspect of the charging control is shown by the line 323 of FIG. 7B. Referring to the line 323, the estimated temperature value Ta (t2) at time t2 falls between the upper target temperature limit TGT-H and the upper limit T3 of the standard temperature range. Therefore, the MPU 113 decreases the setting current Ichg of the battery charger 51 at time t2.

When the MPU 113 determines in block 269 that the estimated temperature value Ta is lower than the upper target temperature limit TGT-H, the estimated temperature value Ta falls between the lower target temperature limit TGT-L and the lower limit T2 of the standard temperature range. In such a case, since the charging current is too low and thus the charging time is too long, the MPU 113 proceeds to block 273, where the setting current Ichg of the battery charger 51 is changed to increase the charging current, and thereafter, the operation of block 253 is performed. In FIG. 8, a temperature range 357 is the range of the estimated temperature value Ta when the flow proceeds from block 269 to block 273.

This aspect of the charging control is shown by the lines 311 and 313 of FIG. 7A and the line 327 of FIG. 7B. Referring to the line 311, the estimated temperature value Ta (t3) at time t3 falls between the lower target temperature limit TGT-L and the lower limit T2 (not shown) of the standard temperature range. Therefore, the charging current is increased by the MPU 113 at time t3. When the procedures of FIG. 6 are repeated whereby the estimated temperature value Ta is calculated for each monitoring time Δt and thus the charging current is changed in accordance with the estimation result, the surface temperature value does not exceed the upper limit T3 of the standard temperature range even when the charging is performed up to the corrected RSOC (%). In addition, since the setting current Ichg can be set to a value close to the maximum value within an allowable range that is allowed by the surface temperature T of the battery cells 103 to 105 at the charge start time and the ambient temperature during charging, the charging time is not increased.

In block 251, the setting current is set to the minimum charging current value Imin. As shown in FIG. 7A, although the charging is started with the minimum charging current value Imin, when the surface temperature T at the charge start time is low and the ambient temperature is not high, the charging current is increased later so that the charging is performed with the standard maximum charging current value Imax1 over the most of the constant current control period. Therefore, in such a case, by performing the charging with the standard maximum charging current value Imax1 from the start thereof, it is possible to eliminate the period where the charging current is suppressed more than needed, which may lead to prolonged charging time.

To solve such a problem, the MPU 113 stores in the flash memory as a charging history, a set of parameters including the surface temperature T at the charge start time obtained when charging was previously performed and the ambient temperature and data related to a charging current value that allows stable charging under the parameters. When the same or similar parameters are observed at a subsequent charge start time, the setting voltage Ichg may be set to the charging current value that allows stable charging instead of the minimum charging current value Imin.

Although at least one embodiment has been described for the case where the MPU 113 installed in the battery pack 100 controls the battery charger, the present invention may be configured such that a processor installed in an notebook PC having mounted thereon a battery pack without having a processor installed therein executes the procedures to thereby control the battery charger. In such a case, the charging program is stored in a flash memory of the notebook PC or a hard disc drive.

Aspects of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, aspects of the present invention may also be downloaded as a computer program product, wherein the program may be transferred from a remote computer to a requesting computer by way of data signals embodied in a carrier wave or other propagation medium via a communication link (e.g., a modem or network connection).

If not otherwise stated herein, it is to be assumed that all patents, patent applications, patent publications and other publications (including web-based publications) mentioned and cited herein are hereby fully incorporated by reference herein as if set forth in their entirety herein.

The present invention has been described with reference to the specific embodiment illustrated in the drawings. However, the present invention is not limited to this embodiment, and of course, so long as the effects provided by the present invention are obtained, any kind of well known configuration can be employed.

What is claimed is:

1. An apparatus comprising:
   a temperature element that determines a surface temperature of a battery; and
   a charging control unit that receives an output from the temperature element and varies a current to the battery based on a result of comparison between an estimated surface temperature and a target temperature range to maintain the surface temperature of the battery within the target temperature range.

2. The apparatus according to claim 1 wherein a maximum surface temperature is achieved when the battery is charged to a predetermined charging amount.

3. The apparatus according to claim 1, wherein the charging control unit is adapted to switch between a constant current control mode and a constant voltage control mode.

4. The apparatus according to claim 3, wherein the target surface temperature range is defined to allow charging with a current lower than a maximum current;
   wherein an upper limit of the target surface temperature range is identical to a maximum surface temperature; and
   wherein the charging control unit charges the battery with a charging current lower than the maximum current over a period of constant current control and thereafter transitions to a period of constant voltage control.

5. The apparatus according to claim 4, wherein the upper limit of the target temperature range is set to be one to three degrees centigrade lower in temperature than the maximum surface temperature.

6. The apparatus according to claim 1 further comprising:
   a stored correction table which sets therein a Relative State of Charge (RSOC) for every charging current and is accessible to the charging control unit;
   wherein, upon achieving a maximum surface temperature, the predetermined charging amount corresponds to an RSOC for a particular current.

7. The apparatus according to claim 1, wherein the target temperature range ranges from one to three degrees centigrade.

8. The apparatus according to claim 1, wherein the charging control unit decreases the current if the estimated surface temperature exceeds the target temperature range, maintains the current if the estimated surface temperature is within the target temperature range, and increases the current if the estimated surface temperature falls below the target temperature range.

9. The apparatus according to claim 1 further comprising:
   a keyboard.

10. The apparatus according to claim 1, wherein the charging control unit calculates the estimated surface temperature from a rate of increase in the surface temperature for a predetermined monitoring time and a charging time required for reaching a predetermined charging amount.

11. The apparatus according to claim 1, wherein the charging control unit calculates a charging time required for reaching a predetermined charging amount based upon an average value of the current flowing during a predetermined monitoring time.

12. The apparatus according to claim 1, wherein the charging control unit sets the current to a minimum current when the estimated surface temperature exceeds the upper limit of the target temperature range.

13. A method comprising:
   determining a surface temperature of a battery;
   providing a target temperature range;
   calculating an estimated surface temperature;
   comparing the estimated surface temperature with the target temperature range; and
   varying a current charging the battery so that a surface temperature of the battery does not exceed an upper temperature limit of the target temperature range.

14. The method of claim 13, further comprising the steps of:
  storing a history of the current charging the battery; and
  determining a minimum current to be used for charging based on the stored history.

15. The method according to claim 14, further comprising:
  setting the current to the minimum current when the estimated surface temperature exceeds the upper limit of the target temperature range.

16. The method according to claim 13, wherein a maximum surface temperature is achieved when the battery is charged to a predetermined charging amount.

17. The method according to claim 13, further comprising:
  switching between a constant current mode and a constant voltage mode for charging the battery dependent upon the estimated surface temperature of the battery.

18. The method according to claim 13, wherein said varying step further comprises:
  decreasing the current if the estimated surface temperature exceeds the target temperature range;
  maintaining the current if the estimated surface temperature is within the target temperature range;
  and increasing the current if the estimated surface temperature falls below the target temperature range.

19. A program storage device readable by machine, tangibly embodying a program of instructions executable by the machine to perform a method comprising:
  receiving a determined surface temperature of a battery;
  providing a target temperature range;
  calculating an estimated surface temperature;
  comparing the estimated surface temperature with the target temperature range; and
  varying a current charging the battery so that a surface temperature of the battery does not exceed an upper temperature limit of the target temperature range.

* * * * *